Aug. 6, 1968    H. M. MINCHENKO    3,396,285
ELECTROMECHANICAL TRANSDUCER
Filed Aug. 10, 1966    3 Sheets-Sheet 1

INVENTOR.
Hildegard M. Minchenko
Antony D. Cusano

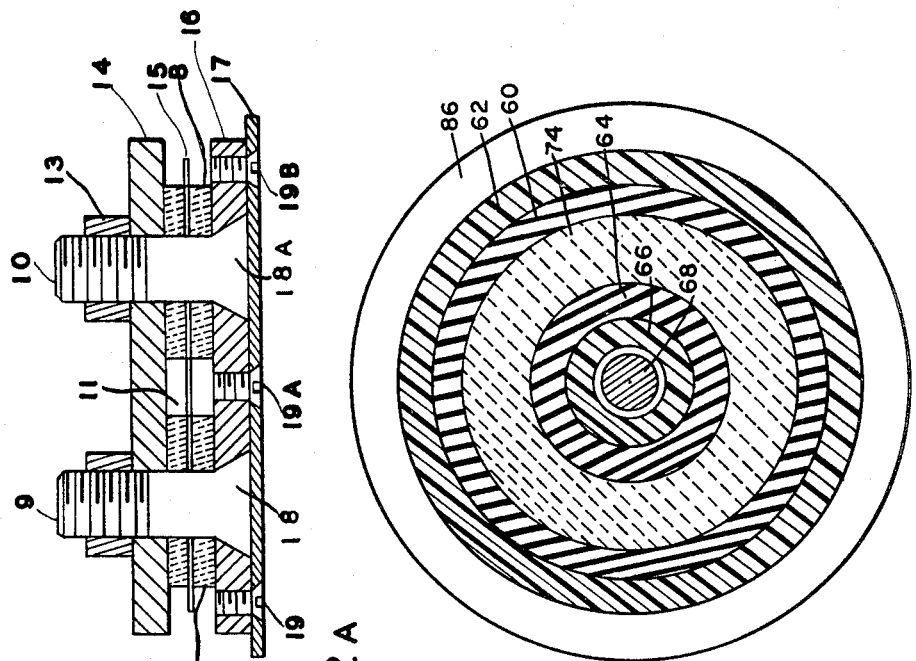
FIG. 5
FIG. 2A
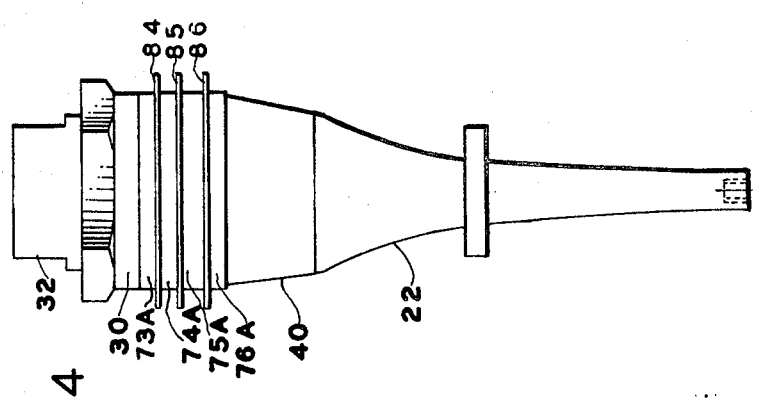
FIG. 4

Aug. 6, 1968  H. M. MINCHENKO  3,396,285
ELECTROMECHANICAL TRANSDUCER
Filed Aug. 10, 1966  3 Sheets-Sheet 3

INVENTOR.
Hildegard M. Minchenko
BY
Anthony D. Cennamo

United States Patent Office 3,396,285
Patented Aug. 6, 1968

3,396,285
ELECTROMECHANICAL TRANSDUCER
Hildegard M. Minchenko, Reynoldsburg, Ohio, assignor to The Board of Trustees of the Ohio State University, an institution of higher learning, Columbus, Ohio
Filed Aug. 10, 1966, Ser. No. 571,490
15 Claims. (Cl. 310—8.7)

ABSTRACT OF THE DISCLOSURE

The present invention is for a piezoelectric transducer capable of delivering extremely high power, i.e., measurable in horsepower (or kilowatts) at an acoustical frequency range. The principle underlying the high-power output is in the structural arrangement of the components immediately associated with the piezoelectric driving elements. In theory and practice the piezoelectric elements are under radial and axial pressure that assure that they do not operate in tension even under intense sonic action. Significantly, the structural design of the transducer of the present invention, that permits the extraordinary power output from the driving elements, resides in the novel method of clamping the piezoelectric elements both radially and longitudinally (axially). In this way the acoustic stresses in the piezoelectric elements are always compressive, never tensile, even under maximum voltage excitation.

Background

An electromechanical transducer such as a piezoelectric device is capable of transforming high frequency electrical impulses into high frequency mechanical impulses or vice versa. With an alternating-polarity input-voltage imposed on the piezoelectric elements, the transducer generates, transmits and amplifies a series of mechanical compression waves in the piezoelectric material and its metal supporting structure respectively. Considering the transducer alone, a succession of identical compression and tension waves transmitted in a transducer of proper length, produces a standing wave pattern.

In a straight bar the standing wave maxima and minima locations correspond respectively to locations of maximum and minimum velocity, minimum and maximum stress, and maximum and minimum displacement on the transducer body. These locations determine optimum positions for points-of-support, "steps" or changes in diameter, tools or mechanical couplers, etc. The node locations on the transducer correspond to locations of minimum axial displacement and velocity, the anti-node locations correspond to locations of maximum axial displacement and velocity or motion. The distance measured on the transducer between adjacent anti-nodes is equal to one-half wavelength at the fundamental resonance frequency, the length being dependent and variable with the shape.

There is disclosed in the co-pending application filed by Robert C. McMaster and Berndt B. Dettloff on Nov. 19, 1965, S.N. 508,812, for "Transducer," a sonic transducer that combines the driving element (piezoelectric) with the mechanical displacement amplifier (horn) in a novel way. It is in essence a resonant horn structure excited internally close to the vibrational node. The excitation is in contrast to the external excitation common when horns are utilized in a sonic transducer system. The transducer therein disclosed is a high Q transducer, exceptionally rugged, compact, and capable of carrying continuous work loads.

There is disclosed in another co-pending application—also filed on Nov. 19, 1965, S.N. 508,774, for Sonic Transducer in the name of Charles C. Libby, and assigned to the same assignee as the above-mentioned application and the instant application—utilizing the principles of the transducer in the aforementioned co-pending application. The overall structure is improved and operable in a manner to demonstrate commercial feasibility. Some of the features of that transducer include a means of positioning or applying external force through a holding fixture supported near the node of the transducer. The clamping arrangement providing internal static stress or mechanical-bias is acoustically an integral part of the horn. The output end of the transducer is threaded for attachment coupling to the tool. Other features are disclosed.

Brief description of invention

The use of sonic energy has been suggested extensively in all fields of endeavor. Although the uses of sonic energy has been at an increasing pace, realistically its use has been limited by one primary factor, i.e., power. The prior art, in referring to high-power transducers, refers to transducers "up to 10 watts." For such purposes as earth removal, concrete destruction (road wrecking) and other similar work efforts, this amount of power is negligible. A transducer to be economically acceptable in heavy work loads of this nature must have a power output of a horsepower or greater. Known transducers generally lack the ability to handle large power levels continuously. Further, the permissible stresses and strains that can be endured by the electromechanical transducer material are so low that these materials are soon destroyed by the amounts of power that can be usefully employed in such processes. The only realistic solution hereintofore was the brute force method of employing more transducers or alternatively by increasing the number of horns. The cost of an installation of appreciable size is beyond economically acceptable limits. Simply then, the art awaits a transducer that at reasonable cost will have a high energy output.

The present invention is for a transducer capable of delivering extremely high power, i.e., measurable in horsepower (or kilowatts) at an acoustical frequency range. The principle underlying the high power output is in the structural arrangement of the components immediately associated with the piezoelectric driving elements. In theory and practice the piezoelectric elements are under radial and axial pressure that assure that they do not operate in tension even under intense sonic action. Significantly, the structural design of the transducer of the present invention, that permits the extraordinary power output from the driving elements resides in the novel method of clamping the piezoelectric elements both radially and longitudinally (axially). in this way the acoustic stresses in the piezoelectric elements are always compressive, never tensil, even under maximum voltage excitation.

Objects

It is accordingly, the primary object of the invention to provide a novel and improved structural arrangement for a sonic transducer.

It is another object of the invention to provide a new and novel structural arrangement for a driving element in a sonic transducer.

It is another object of the invention to provide a novel structural arrangement for a sonic transducer wherein the acoustic stresses in the driving elements are always compressive and never tensile even under maximum voltage excitation.

It is a further object of the invention to provide a novel structural arrangement for a sonic transducer that is capable of transmitting extraordinarily high power output.

Further objects and features of the present invention will become apparent from the following detailed description when taken in conjunction with the drawings in which:

Brief description of the drawings

FIGURE 2a is a cross-sectional view illustrating the piezeolectric driving assembly in accordance with the present invention;

FIGURE 4 is still another alternative complete embodiment of the transducer utilizing the piezoelectric driving assembly of the present invention;

FIGURE 5 illustrates the adaptation of the piezoelectric driving assembly of FIGURE 2a in another sonic transducer structural arrangement;

FIGURE 6 is a graph illustrating the fractional volume expansion as a function of temperature of the resilient material contained in the driving assembly shown in FIGURE 2a; and, FIGURE 7 is a graph illustrating the bulk modulus and spring constant of the resilient material contained in the driving assembly shown in FIGURE 2a.

Detailed description of the drawings

In accordance with the general concepts of the electromechanical transducer described in the first aforementioned co-pending application, a horn type of displacement amplifier having a length of half-wave comprised a pair of sections integrally formed. The lower part of the horn is tapered—in one manner or another—for transmitting the work motion. The upper part of the horn structure is turned down to bolt size and fits snugly into a bore to complete the upper part. The piezoelectric transducer elements are placed between the two sections. The bolt provides the mechanical bias as a compressive stress larger in magnitude than the maximum amplitude of the alternating stress generated in the piezoelectric elements. A nut on the upper part of the bolt joins the component parts under compression.

The present invention utilizes the theory and principles of mechanical structure of the transducer of the aforementioned co-pending application and improves thereon in several significant structural features and further incorporates therein certain innovations.

Figure 2:
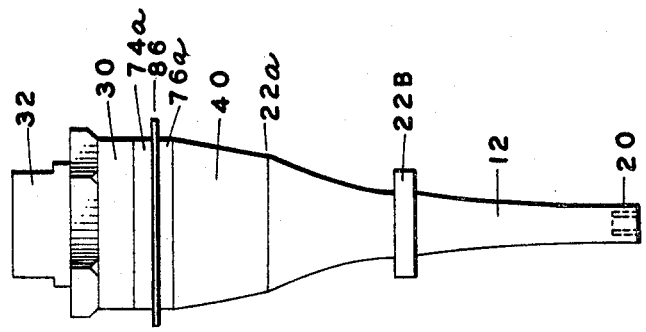
FIGURE 2 is a complete preferred embodiment of the transfer utilizing the piezoelectric driving assembly of the present invention.
Figure 3:
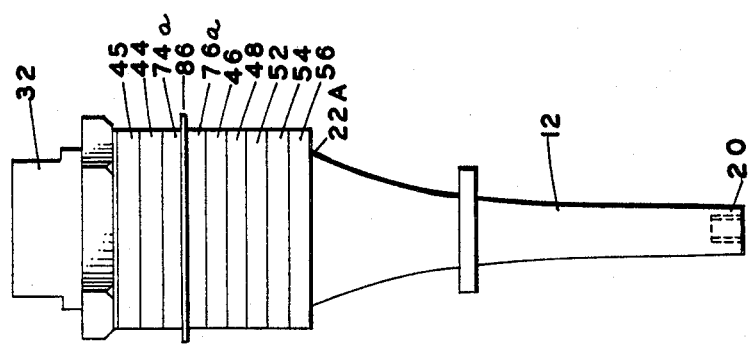
FIGURE 3 is an alternative complete embodiment of the transducer utilizing the piezoelectric driving assembly of the present invention.
Figure 1:
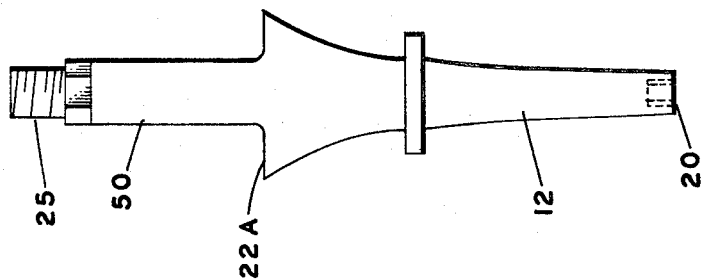
FIGURE 1 illustrates the integral structure of a sonic transducer horn and body.

The preferred embodiment of the invention comprises—as generally shown in FIGURES 1, 2 and 3—a half-wave driving element. The driving element further contains the clamping structure that joins the driving element to the horn. An integral bolt joins the horn to the driving elements, and forms the tensile member in the longitudinal clamping arrangement. The radial pressure system consists of concentric rings of resilient material which surround piezoelectric rings on both sides. The resilient material rings are "restrained" both in their inside diameter and their outside diameter by non-resilient rings. The piezoelectric driving assembly 74a consisting of concentric rings is illustrated in FIGURE 2a referred to hereinafter.

Referring now specifically to FIGURES 1 and 2 the integral structure includes the tapered bar 12 extending from its tip 20 to the base of horn 22a. The tapered metal is originally of bar stock and turned down also to form bolt 50 extending through the piezoelectric driving assembly 74a and 76a having the electrode 86 therebetween. Positioned on the upper region of the bolt 50 is the upper metallic spacer 30 and nut 32 (FIGURE 2) secured to the threaded end 25 (shown in FIGURE 1). Positioned on the lower region of the bolt 50 is the spacer 40 between the piezoelectric driving assembly 76a and the base of horn 22a.

As described in the aforementioned co-pending applications the amplitude of vibration versus longitudinal position on the transducer, show the node points as locations of zero displacement. The node points are found at or near positions corresponding to the location of the electrode 86 and at the flange 22b in FIG. 2. The point of maximum amplitude occurs at the horn tip 20 or antinode, and the magnification or amplification of the horn is represented by the ration of displacement at the tip 22 of the horn to that at the base of the horn 22a.

Another arrangement of the horn and body of the transducer of the present invention is shown in FIGURE 3. Originally a plurality of piezoelectric rings were stacked between the base of the horn 22a and the nut 32. Since very high voltages are necessary to excite each piezoelectric ring, the rings were connected in parallel electrically. This was done by using a series of electrodes sandwiched between the rings. Tests showed that considerable phase-shift was present in voltages measured between the piezoelectric rings in the stack. It is assumed that this shift partially cancelled the effectiveness of each ring. Therefore all but two of the piezoelectric driving elements were replaced by steel washers 42, 44, 46, 48, 52, 54, and 56.

Tests were then made with various locations of the piezoelectric assemblies 74a and 76a with respect to the transducer horn in order to maximize its power capabilities. Utilizing an impedance-admittance meter and an X–Y recorder, impedance circles were plotted for various positions and all major resonant frequencies. It is in this position that the several piezoelectric rings, located between the driving elements and the horn, were replaced by the steel discs. Subsequently, impedance circle diameters were plotted as a function of the applied torque, with the transducer assembled in position as shown in FIGURE 3. By adjusting the torque to a certain level, the circle diameter characteristic of the transducer has been significantly improved. With this torque the resonant frequency of the complete configuration equals the design frequency.

Referring again to FIGURE 2, it can be seen that the transducer construction has been simplified by the use of a single conical spacer 40 in place of the several disc-shaped spacers located next to the horn as shown in FIGURE 3. This change has not only achieved a better impedance match between the driving elements and the horn, but has eliminated energy losses by reducing the number of metal interfaces between the drivers and the horn. To further improve the transducer characteristics the two spacers 42 and 44 adjacent to the nut have been replaced by a single spacer 30.

Referring to FIGURE 4 there is shown still another embodiment of the horn transducer of the present invention. In certain respects this embodiment may be considered as a combination of the features of FIGURES 2 and 3. As set forth above, certain losses were attendant with the configuration of FIGURES 3; however, the multiple driving element does have increased power. Accordingly, although the configuration of the transducer of FIGURE 2 results in the highest horsepower per cubic inch of active material, the multiple piezoelectric driving element of FIGURE 4 results in a transducer having the total highest horsepower.

Specifically, there is shown in FIGURE 4 a transducer substantially identical to that of FIGURE 2. The primary exception being in that four piezoelectric driving assemblies, 73a, 74a, 75a, and 76a, are utilized in place of the two driving assemblies shown in FIGURE 2. Further, to complete the structure, two electrodes, 84, and 86, and the added ground connection 85 are utilized in place of the single electrode of FIGURE 2.

The operation of the transducer of FIGURE 4 is relatively that of FIGURE 3 with the notable improvement in increase in overall power.

There is described in somewhat detail above the horn-type transducer of the aforementioned co-pending applications. Although the structures shown in FIGURES 2, 3 and 4 resulted in a transducer that has proved to be extremely successful and truly capable of continuous operation at outputs measurable in horsepower (kilowatts), it is to be understood that the invention of the present invention is not to be limited to this type of transducer. The piezoelectric driving assembly—that is the primary feature of the new and improved transducer of the present invention—was initially incorporated in the horn type of transducer since this type of transducer was (a) electrical to mechanical power, (b) a resonant structure, (c) a high Q resonant structure, and (d) capable of continual operation. These four features were essential for the particular purpose. For other intended purposes, functions or uses, other types of transducers or arrangement of elements for continuous or pulsed operation may be more desirable. The piezoelectric driving assembly of the present invention readily adapts itself to other arrangement of components making up a transducer.

With reference to FIGURE 5 there is shown the piezoelectric driving assembly utilizing the principles of the present invention in another sonic transducer structural arrangement. There is shown in FIGURE 5 a flat plate type of Langevin sandwich sonic transducer. Basically, the transducer of FIGURE 5 comprises a pair of plates 14 and 16 having two pairs of piezoelectric driving assemblies 7 and 8 sandwiched therebetween and secured for high power work by studs 9 and 10. Specifically, bottom plate 17 is the work transfer medium. Positioned in planar relation to the plate 16 is the work surface plate 17. These two plates are secured by machine screws 19a, 19b, and 19c in this embodiment. Diverting for the moment, upper plate 14 is of substantially the same configuration as the lower plate 16. These plates are in this particular embodiment of rectangular shape, that is, two side-by-side squares. Positioned centrally in each of the two squares are the pairs of piezoelectric driving assemblies 7 and 8 respectively. These driving assemblies are identical in structure and operation as set forth above relative to the driving assemblies in FIGURES 2, 2a, 3, and 4. Studs 9 and 10 firmly secure the two plates 14 and 16 in tight compressive relationship to the driving elements 7 and 8. The studs 9 and 10 rests on the bevelled portions 18 and 18a and at the opposite end are secured by nuts such as at 13.

During early tests it had been found that the piezoelectric rings fracture very easily when high voltages were applied; accordingly, only a very short time of full voltage operation was possible. In order to achieve a high power and continuous duty transducer the piezoelectric rings 74 and 76 have been placed under radial compression. With reference to FIGURE 2a the specific improvement was accomplished by the use of concentric rings of high temperature silicone rubber 60 and 64 encircling the piezoelectric ring 74 on its internal and external diameters. In turn the rubber rings are confined within glass-fiber melamine-impregnated sleeves 62 and 66, also on their inside and outside diameters. Longitudinal compression of the rubber applies balanced radial forces both to the inside diameter and outside diameter of the piezoelectric elements. In this way, although it reduces the Q of the transducers, the structural arrangement has proved very successful under severe service conditions. It not only prevents the piezoelectric material (ceramic) from fracturing, but serves at the same time to reduce the possibility of flashover across the edges of the piezoelectric rings.

The silicone rubber rings 60 and 64 are contained or restrained within outer and inner melamine rings 62 and 66. The internal melamine ring 66 is a relatively long tube which is common to the several of the piezoelectric rings. Concentric rings 60, 62, 64, 66, and 74 constitute the piezoelectric driving assembly 74a in FIGURE 2a as described above. The external melamine ring 62 is segmented to allow the electrode disc 86 to extend radially outward, for purposes of connecting the piezoelectric rings 74 and 76 to the excitation.

The clamping structure, described above, provides a method of exerting a controlled static stress on the piezoelectric driving elements 74 and 76, in both the radial and axial directions. By this means the net dynamic stresses, developed in the piezoelectric elements 74 and 76, are compressive at all times, even under intense excitation (with high voltage).

The radial pressure system is not only capable of developing the necessary pressure but it is a controlled pressure system. That is, the radial pressure is developed in this design, mostly after the piezoelectric elements 74 and 76 have been first clamped under considerable axial pressure. It is this chronology of events which prevents the semi-plastic medium 60 and 64 (which carries the pressure hydrostatically to the piezoelectric elements) from inserting itself under or between the piezoelectric elements 74 and 76. Due to the design of the restraint system, pressure developed within the rubber rings can act only radially on the ceramic rings.

In operation, pressure from the outside is developed radially on the piezoelectric rings in assembly of the rings. Longitudinal compression or mechanical bias is then exerted on the ceramic elements by "torquing down" the upper nut 32 to the prescribed torque value (torquing procedure is described in the aforesaid patent applications). The dimensions are so selected that the rubber rings 60 and 64 are also submitted to some axial force. Since they are confined, as described above with relation to FIGURE 2a, they exert pressure both radially and axially. The rubber is prevented (by dimensional control) from developing sufficient radial pressure to cause any rubber to flow over the flat surfaces of the piezoelectric elements. Second the rubber is expanded within its confined space due to its temperature coefficient of expansion. The heat source causing the temperature rise is the transducer losses during power operation. Since the rubber is submitted to intense sonic agitation it acts as a hydrostatic fluid and compresses the piezoelectric rings radially. During this time the longitudinal pressure on the piezoelectric elements is sufficient to prevent any flow of rubber under the piezoelectric elements.

During assembly a static pressure of approximately $2.6 \times 10^3$ p.s.i. is exerted radially from the outside of the driving element. It is important that there also exists a pressure compressing the piezoelectric ring from the inside, to assure a compressing force from all directions at all times. It is also important that the net pressure (differential) shall always be radial from the outside.

The piezoelectric element is compressed by two opposing radial forces—one exerted from the outside toward the inside and the other from the inside toward the outside. The actual radial pressure exerted depends upon the operating temperature of the transducer, and builds up linearly as a function of temperature. Temperature increase of 100° F. results in a pressure increase of $5.8 \times 10^3$ p.s.i.

Figure 6:
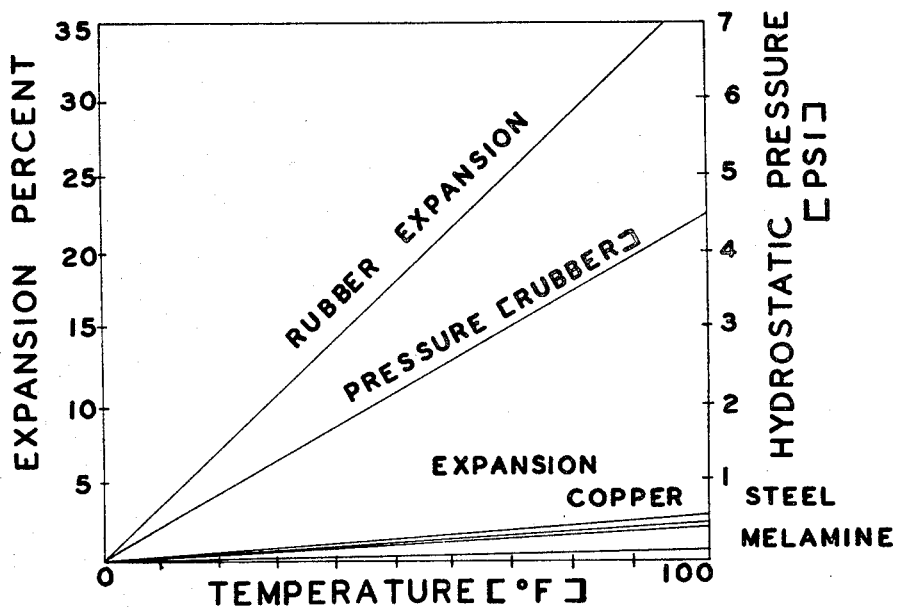

Referring to FIGURE 6 there is shown the fractional volume expansion of the silicone rubber rings 60 and 64 (of FIGURE 1) as a function of temperature as well as the hydrostatic pressure exerted by the confined silicone rubber as a function of temperature. Also shown are the coefficients of volume of expansion of the other materials utilized in the preferred embodiments.

Figure 7:
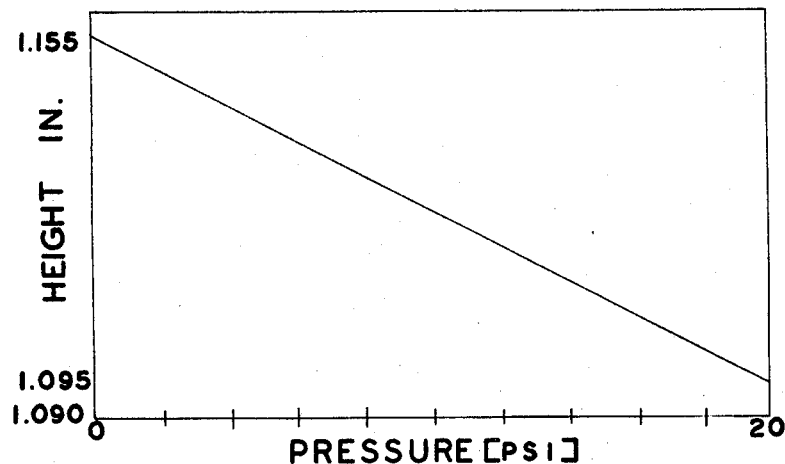

The axial length of the outer melamine ring 62 is so selected, that the longitudinal compressive stress developed during "torquing down" compresses only the internal piezoelectric rings 74 and 76 and rubber rings 60 and 64. The stresses developed during torquing do not significantly compress the outer melamine ring 62. Referring to the graph of FIGURE 7 there is shown the height of a confined resilient material cylinder as a function of pressure. The graph represents data accumulated to determine the bulk modulus and spring constant of the silicone rubber rings 60 and 64 (of FIGURE 1) utilized in the preferred embodiments illustrated.

The semi-plastic or resilient material 60 and 64 is referred to above as silicone rubber. As a generic term and as defined in the Directory/Encyclopedia Issue of Insulation on p. 192 of May 1965 this specific material utilized in the preferred embodiments (Detroit Silicone, 50 Durometer, compound 150 from Fournier Rubber Co.) was found to be exactly suitable for its intended purpose. It is to be understood, of course, that the invention is not to be limited to the material described but would extend to any other material, i.e., liquid, fluid, or substance exhibiting similar properties. The characteristics that are particularly significant in the material 60 and 64 are: (1) its volumetric temperature coefficient; that is, its ability to change volume per degree of centigrade; (2) the change of volume per unit of pressure and (3) the change in pressure with a change in volume. Other characteristics of the materials 60 and 64 are that it must be a non-conductor at even high temperatures and as pointed out above elastic. The maintenance of its elastic qualities with time is an essential characteristic.

The non-resilient rings 62 and 66 are referred to above as melamine resin impregnated glass fiber rings. Again the specific material was utilized in the preferred embodiment and found to be successful in constraining the inner assembly. It is to be further understood that other material having similar properties may also be utilized in the clamping structure of the present invention.

What is claimed is:

1. A driver section for an electromechanical transducer comprising: a piezoelectric ring, a pair of semi-resilient material rings fitted on the outside and inside of said piezoelectric ring, and a pair of non-resilient material rings fitted on the outside of one of said resilient rings and on the inside of said other resilient ring, whereby said piezoelectric ring is maintained in compression.

2. A driver section as set forth in claim 1 wherein said rings are fitted one within the other under pressure, and means for applying an axial pressure to said driver section to thereby exert a controlled static stress in both the radial and axial directions.

3. A driver section as set forth in claim 1 further comprising means for applying an axial external force to said piezoelectric elements and said resilient material.

4. A driver section as set forth in claim 1 wherein said semi-resilient material is silicone rubber and said resilient material is melamine impregnated fiber.

5. A driver section as set forth in claim 1 further comprising an elastic material clamping means and means for maintaining said material adjacent said piezoelectric elements under compression.

6. A high power electromechanical transducer comprising: an upper structural section and a lower structural section, a driver section comprising a piezoelectric driving assembly, means positioning said driver section between said upper and lower structural sections, an electrode adjacent said driver section, said driver section including a piezoelectric ring, a pair of semi-resilient material rings fitted on the outside and inside of said piezoelectric ring, and a pair of non-resilient material rings fitted on the outside of one of said resilient rings and on the inside of said other resilient rings, together with said positioning means for applying radial and axial pressure to said piezoelectric elements.

7. The transducer of claim 6 wherein said upper and lower structural sections are flat plates and said driver section is relatively flat, said driver section further comprising means for receiving said positioning means.

8. A transducer as set forth in claim 6 wherein said driver section comprises a series of rings fitted under pressure one within the other.

9. A high power electromechanical transducer comprising: an elongated structure including a tapered bar and an upper section; said upper section including an elongated solid portion integral with said tapered section; a driver section comprising at least a pair of relatively flat piezoelectric elements, said elements having a central aperture therethrough adapted to receive said elongated solid portion, said elements in co-planar relationship with the largest end of said tapered section, an electrode positioned between said piezoelectric elements, said driver section further including an enclosing means for applying radial pressure and means on the elongated portion for applying axial pressure to said piezoelectric elements.

10. The transducer of claim 9 wherein said enclosing means further comprising an elastic material and means for maintaining said material adjacent said piezoelectric elements under compression.

11. A transducer as set forth in claim 9 wherein said enclosing means comprises a series of rings fitted under pressure one within the other.

12. A transducer as set forth in claim 11 wherein said series of rings comprises a piezoelectric ring, a pair of semi-resilient material rings fitted on the outside and inside of said piezoelectric ring, and a pair of non-resilient material rings fitted on the outside of one said resilient rings and on the inside of said other resilient ring, whereby said piezoelectric ring is maintained in compression.

13. A transducer as set forth in claim 11 wherein said rings are fitted one within the other under pressure thereby exerting a controlled static compressive stress on said piezoelectric elements.

14. An electromechanical transducer as set forth in claim 9 further comprising a first spacer positioned between said tapered section and said driver section, retaining means formed in the end of said elongated portion, a second spacer positioned between said retaining means and said driver section, and means for energizing said piezoelectric element.

15. A transducer as set forth in claim 14 wherein said rings are fitted one within the other under pressure, and said means for applying an axial pressure to said driver section through said retaining means to thereby exert a controlled static compressive stress in both the radial and axial directions.

References Cited

UNITED STATES PATENTS

| 3,140,859 | 7/1964 | Scarpa | 310—8.7 |
| 3,183,378 | 5/1965 | McCracken | 310—8.7 |
| 3,317,762 | 5/1967 | Corwin | 310—8 |
| 3,331,589 | 7/1967 | Hammitt | 310—8 |
| 3,339,090 | 8/1967 | Jaffe | 310—8.7 |
| 3,350,582 | 10/1967 | Attwood | 310—8.1 |
| 3,360,665 | 12/1967 | Boswell | 310—8.7 |

FOREIGN PATENTS

| 1,058,773 | 6/1956 | Germany. |

J. D. MILLER, *Primary Examiner.*